March 12, 1946.   G. H. AMONSEN   2,396,549
DRIVE MECHANISM FOR WASHING MACHINES
Filed July 17, 1943   2 Sheets-Sheet 2

Inventor:
G. H. Amonsen.
By Philip A. Terrell
Attorney.

Patented Mar. 12, 1946

2,396,549

UNITED STATES PATENT OFFICE 2,396,549

DRIVE MECHANISM FOR WASHING MACHINES

George H. Amonsen, Minneapolis, Minn.

Application July 17, 1943, Serial No. 495,176

3 Claims. (Cl. 74—218)

The invention relates to driving mechanisms for rotary washing machines of the drum type and has for its object to provide a mechanism whereby the direction of rotation of the washing machine drum will be intermittently reversed for facilitating the washing and agitating operation within the drum.

A further object is to provide the drum shaft with a central drive pulley having idlers on opposite sides thereof a driven countershaft having pulleys thereon driven in opposite directions, endless belts extending over the oppositely driven pulleys, and adapted to be intermittently shifted from peripheral engagement with the drive pulley on the drum shaft and the idle pulleys on opposite sides of the drum drive pulley.

A further object is to provide belt shifter forks cooperating with the belts and carried by a transversely reciprocated shaft and a drive mechanism for said reciprocated shaft comprising a drive shaft having a worm and gear connection to a disc shaft which is rotated for reciprocating a pitman rod connection to the reciprocating belt fork shaft.

A further object is to drive one of the pulleys from the drive shaft through a sprocket and chain connection, and the other pulley on the countershaft by the countershaft through a gear train connection with the drive shaft so that the driven pulleys on the countershaft will rotate in opposite directions.

A further object is to provide means whereby the pitman rod may be quickly detached from the rotatable disc thereby allowing the drum to be constantly rotated in one direction if desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
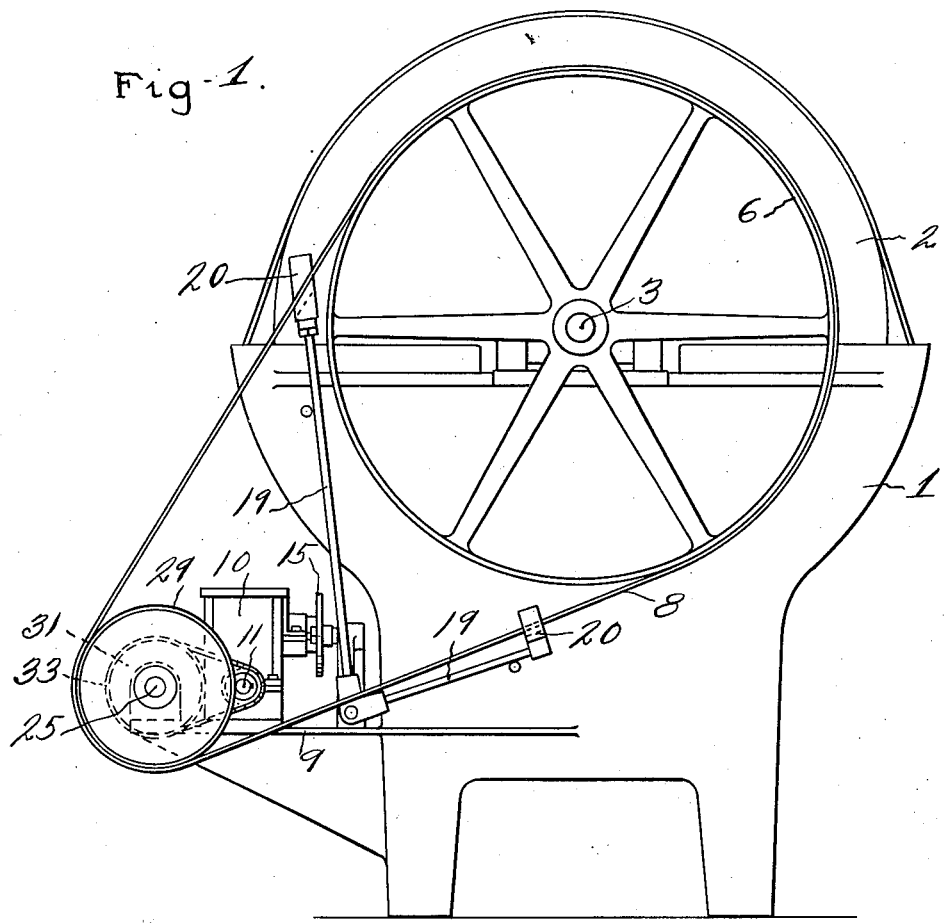
Figure 1 is a side elevation of the washing machine.
Figure 2:
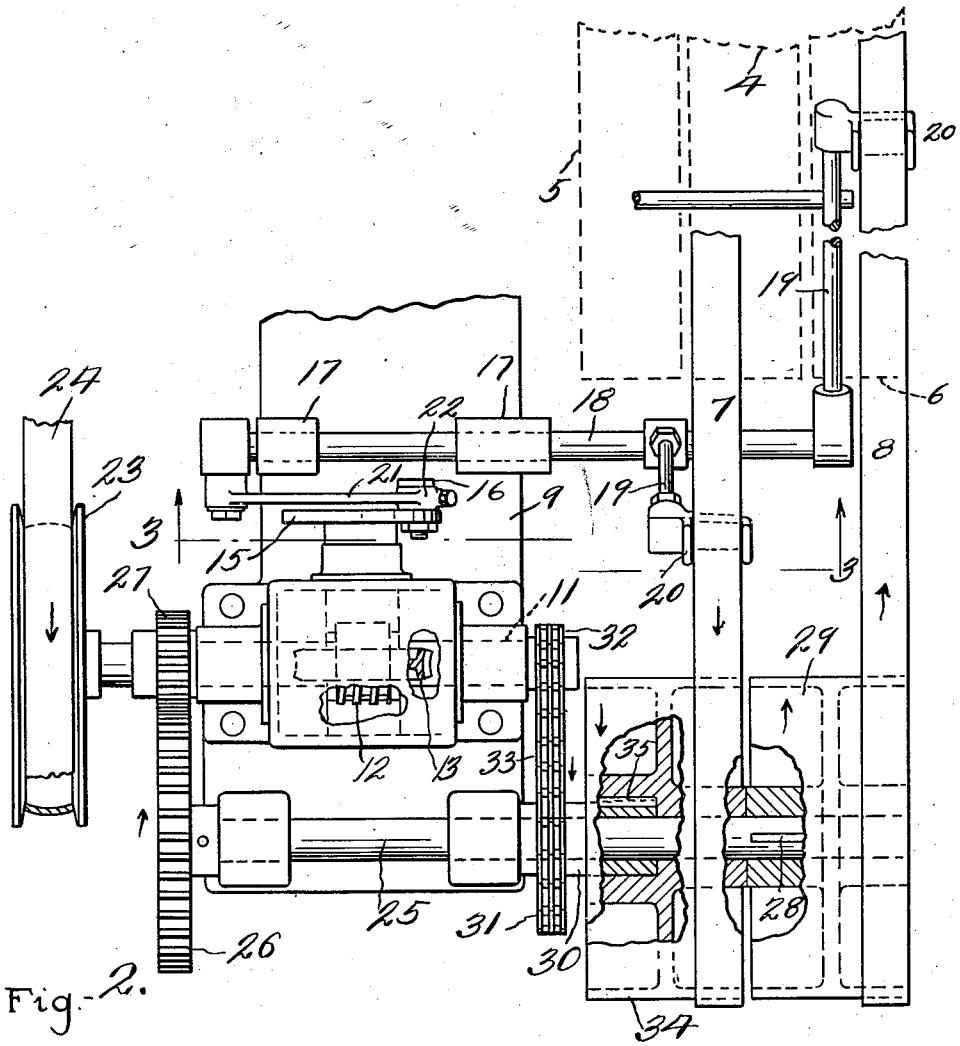
Figure 2 is a top plan view of the reversing mechanism, parts being broken away to better show the structure.
Figure 3:
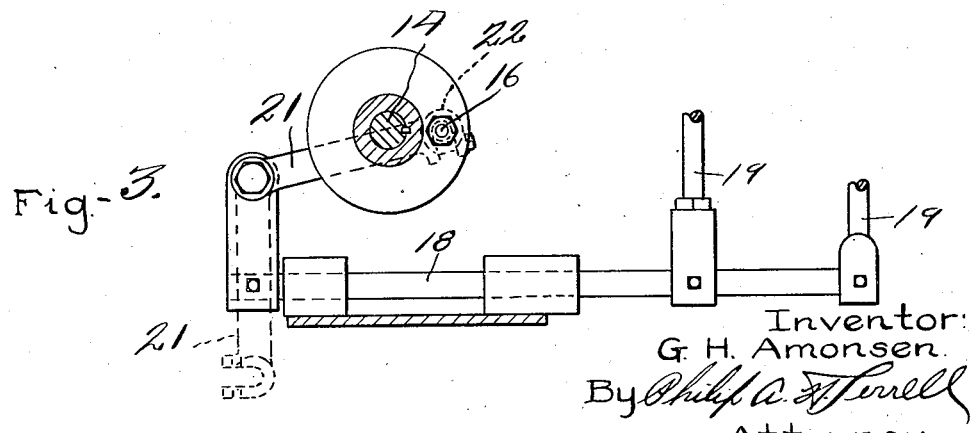
Figure 3 is a transverse sectional view taken on line 3—3 of Figure 2.

Referring to the drawings, the numeral 1 designates a casing of a conventional form of washing machine, 2 the drum therein, and in which the agitating means is disposed. The agitator is provided with an outwardly extending shaft 3 which extends to the side of the casing 1 and has mounted thereon a drive pulley 4, which may be keyed or otherwise secured to rotate the shaft no matter in which direction the pulley is rotated. Disposed on opposite sides of the drive pulley 4, and rotatably mounted on the shaft are idle pulleys 5 and 6, and during the reversing operation the belts 7 and 8, which are driven in opposite directions, are intermittently and alternately shifted from the idle pulleys 5 and 6 onto the driven pulley 4 for imparting a reverse driving movement to the shaft 3, and to the agitator within the drum 2.

Extending outwardly from the front side of the casing 1 is a bracket 9 which supports the driving and reversing mechanism. Secured to the upper side of the bracket 9 is a gear casing 10, and rotatably mounted in said gear casing, adjacent its lower side, is a transversely disposed worm carrying shaft 11 having a worm 12 thereon, which worm meshes with a worm gear 13 mounted on the disc shaft 14. The disc shaft 14 extends towards the casing 1, and terminates in a disc 15 having a wrist pin 16 in off-center relation thereon. Reciprocally mounted in bearings 17 carried by the bracket 9 is a belt shifter shaft 19 which extends towards the belts 7 and 8 and this shaft is provided with upwardly extending arms 19 which terminate in belt forks 20, which forks engage flights of the belts 7 and 8 so that when the shaft 18 is reciprocated the belts 7 and 8 will be alternately shifted from the idle pulleys to driving engagement with the driven pulley 4.

The wrist pin 16 is connected to the reciprocating shaft 18 by means of a pitman rod 21, which has a fork connection 22 to the wrist pin so that when it is desired to eliminate the reversing feature, said pitman may be disconnected from the wrist pin, thereby allowing the agitator to be continuously rotated in one direction or the other as desired.

Shaft 11 is driven by a pulley 23 mounted thereon, and which pulley may be driven from a line shaft, not shown, by a belt 24. Disposed to one side of the shaft 11 is a countershaft 25, one end of which is provided with a gear 26, which meshes with a drive pinion 27 carried by the shaft 11. Shaft 25 is driven in the same direction at all times. Keyed at 28 on the shaft 25 is a drive pulley 29, over which the belt 8 extends, and never during the belt shifting operation does the belt 8 leave this pulley.

Rotatably mounted on the countershaft 25 is the hub 30 of a sprocket 31, and extending over said sprocket 31 and a sprocket 32, carried by the shaft 11 is a sprocket chain 33. It will be noted that the shaft 25 can freely rotate within the hub 30 without rotating the second drive pulley 34, which is keyed at 35 to the hub 30. It will be noted that the gear connections 26 and 27 will rotate the countershaft 25 in one direction and the sprocket chain 33 will rotate the drive pulley 34 in an opposite direction to the direction of rotation of the drive pulley 29, hence it will be seen that as the belts 7 and 8 are shifted sidewise opposite rotations will be imparted thereto and as the belts 7 and 8 are intermittently moved from the idle pulleys 5 and 6 onto the driven pulley 4 reverse rotation will be imparted to the agitator within the washing machine.

From the above it will be seen that a reversing mechanism is provided for washing machines which is simple in construction, and one wherein the arrangement of pulleys, shafting and gears will insure a positive operation at all times.

The invention having been set forth what is claimed as new and useful is:

1. A driving and reversing mechanism for agitator driven shafts of washing machines, said mechanism comprising a driven pulley on the agitator shaft and rotatable therewith, idle pulleys on opposite sides of the driven pulley, a driven countershaft, means for rotating said countershaft constantly in one direction, a drive pulley rotatable with the countershaft and mounted thereon, a second drive pulley rotatably mounted on the countershaft, means for rotating said second drive pulley in a direction opposite to the direction to the rotation of the first drive pulley, belts extending over said drive pulleys on the countershaft and the driven and idle pulleys of the agitator shaft and belt shifting means co-operating with said belts for alternately shifting one of said belts off of idle pulleys on the agitator shaft and onto the driven pulley whereby said driven pulley will be alternately driven in one direction or the other.

2. A device as set forth in claim 1 wherein the means for rotating the countershaft comprises a drive shaft, a gear train connection between the drive shaft and the countershaft for rotating the countershaft constantly in one direction, a drive connection between the drive shaft and the drive pulley rotatable on the countershaft for constantly rotating said last named pulley in the direction opposite to the direction of rotation of the countershaft, said belt shifter means being mounted on a reciprocating shaft, a worm gear carried by the drive shaft, a gear shaft at a right angle to the last mentioned drive shaft, a worm gear carried by the gear shaft and meshing with the worm gear on the drive shaft and a crank and pitman connection between the gear shaft and the reciprocating gear shifter shaft.

3. A device as set forth in claim 1 wherein all of the operating and reversing mechanism is driven from a single source of power.

GEORGE H. AMONSEN.